June 14, 1938. J. R. YOTTA 2,120,638
BORING HEAD
Filed Nov. 15, 1937
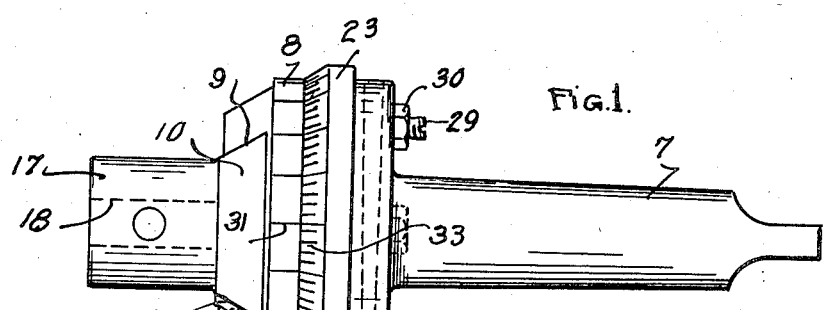
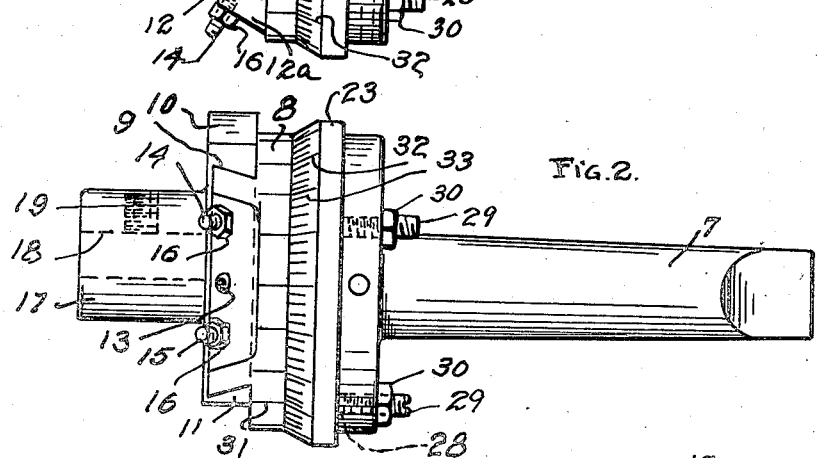
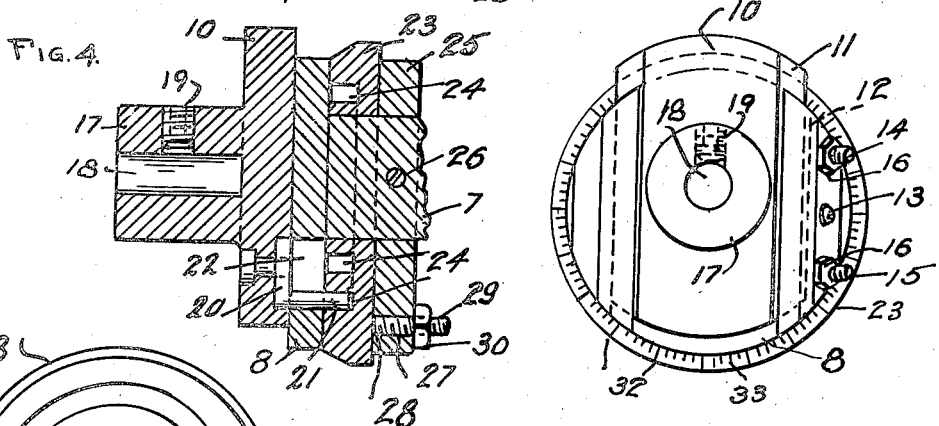
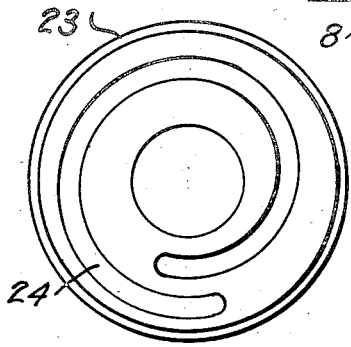
INVENTOR.
Frank R. Yotta Patented June 14, 1938

2,120,638

UNITED STATES PATENT OFFICE 2,120,638

BORING HEAD

Jean R. Yotta, Los Angeles, Calif.

Application November 15, 1937, Serial No. 174,623

3 Claims. (Cl. 279—6)

My invention relates primarily to a boring head for use with metal working machines such, for instance, as milling machines, drill presses, lathes etc., and it has for its prime object the provision of a device of that character which, while being extremely simple in construction and operation, will provide a maximum range of adjustability with maximum accuracy.

Another prime object is to provide, in a device of the above character, means whereby adjustment may be made with the device in any position around its circumference thus eliminating the necessity for stopping the machine at any particular point, or rotating the same by hand until the indicia appears to view, as is the case with the present type of such devices.

Another object is to provide a device of the above character which will be simple in construction and operation and of maximum efficiency.

Other objects and advantages will appear hereinafter and, while I have shown and will describe the preferred form of my invention, I wish it to be specifically understood that I do not limit myself to such preferred form but that various changes and adaptations may be made therein without departing from the spirit of my invention.

In the drawing accompanying and forming a part hereof:

Fig. 1 is a side elevation of a boring head constructed according to my invention.

Fig. 2 is a view taken at right angles to Fig. 1.

Fig. 3 is a bottom or left hand view of Fig. 2.

Fig. 4 is a central vertical section through Fig. 2, partly broken away.

Fig. 5 is a bottom elevation of the tool holding slide block adjusting scroll.

Referring to the drawing my device comprises a stem 7 of a configuration suitable to the opening in the tool holding spindle (not shown) of the machine with which it is to be used, and while I have illustrated this stem as being tapered it will be understood that any other shape or configuration may be used as desired or found necessary. Rigidly secured at one end of this stem, preferably integral, is an enlarged head 8, preferably disc shaped, and formed in the outer face of this head is an inwardly beveled guideway or ways 9, in which is adapted to be slidably mounted the tool holding block 10 by means of the beveled slide 11, a gib 12 being provided to permit adjustment for wear. Gib 12 is held positioned by the screw 13 projecting through one side of the block ways 12a and adjusting screws 14 and 15 are similarly positioned with the lock nuts 16.

Projecting from the opposite or outer face of the block 10 is a concentric boss 17 and in this boss is provided a concentric recess 18 for the reception of the end of the tool bit, (not shown) a set screw 19, or other securing means being provided for securely fastening this tool bit in position for use.

Detachably secured to the inner face of block 10 near the end thereof is a follower 20, provided at one end with a follower stud 21, which stud passes through a slot 22 in the head 8 and projects for a distance therethrough. Rotatably mounted around the stem 7 at the inner face of the head 8 is the adjusting or regulating disc 23 and provided in the opposed face of this disc 23 is a scroll shaped track or guide way 24 into which the projecting end of the follower stud 21 projects so that as this adjusting disc is rotated this follower stud will travel in said track and will cause the tool holding block to move transversely of the head 8 and increasing or decreasing the distance of the tool bit from the axis of the stem. Mounted to surround stem 7 and abutting against the adjacent face of the disc 23 is a collar 25 held rigidly positioned by means of a pin 26, and this collar serves to hold disc properly positioned for use.

Provided through this collar 25 near the edge thereof and at spaced intervals are screwthreaded apertures 27 and positioned within these apertures to bear against the face of the disc 23 are friction discs 28 of any suitable material. Screwthreadedly mounted within these apertures 27 are adjusting studs 29, each of which is provided with a lock nut 30 by means of which the screw is locked in its adjusted position. The function of these screws is to regulate the pressure of the friction discs 28 against the face of the disc 23 while at the same time permitting rotation of said disc around stem 7. Provided around the outer periphery or circumference of the head 8 are a plurality of equally spaced indicating lines 31, and provided upon the beveled portion of the circumference of the disc 23 are an equal number of similarly spaced registering lines 32, and the space between these latter lines is again divided into an equal number of equal spaces by means of the shorter lines 33, and inasmuch as these lines extend entirely around the circumference of the head 8 and disc 23 it is obvious that adjustment may be made with the device in any period of its rotation.

It is obvious that by varying the pitch of the scroll 24 and/or the spacing of the lines 31, 32 and 33 an infinite variety of indexing can be provided.

In the operation of my boring head the same will first be positioned upon the spindle of the machine with which it is to be used by means of the stem 7. The disc 23 may then be rotated to bring the tool bit into the desired location or position.

As the work progresses the disc 23 may be rotated to move the tool block, and with it the tool bit (not shown), away from or towards the spindle center thus increasing or decreasing the radius of travel of the tool bit.

Having described my invention what I claim is:

1. A device of the character described comprising a stem arranged for insertion within the spindle of a machine, a head carried upon one end of said stem and rigidly secured thereto, guideways in the exposed face of said head extending transversely of the stem, a tool holding block slidably mounted in said guideways having a recess on the outer face thereof for the reception of the end of a tool bit, means for locking said tool bit in said recess, a collar rigidly mounted to surround said stem at a distance from said head and parallel therewith, an adjusting disc surrounding said stem between said head and collar and rotatable therebetween, a scroll shaped guideway in the face of said disc opposite the inner face of the head, a slot in said head near the edge thereof, a follower stud carried by said tool holding block and projecting through said slot and into said guideway in said disc whereby rotation of said disc will cause said tool holding block to travel in said first mentioned guideways, and indicating means on the outer periphery of said head and disc and extending entirely around the same.

2. A device of the character described comprising a stem, a head carried by said stem at one end thereof and rotatable therewith and being provided on its outer face with transverse guideways, a tool holding block slidably mounted in said guideways and having means for the reception of a boring tool, a collar rigidly mounted upon said stem to surround the same and being spaced from said head, a disc mounted on said stem between said head and said collar and rotatable therebetween, a scroll shaped guidetrack in the face of said disc adjacent the face of said head, a follower stud in the inner face of said tool holding block projecting inwardly through a slot in said head and into said scroll shaped track, a plurality of friction discs carried by said collar adapted to bear against the adjacent face of the disc, means for regulating the pressure of said friction discs against the face of said disc, and coacting indicating means entirely surrounding the outer periphery of said head and disc.

3. In a device of the character described, a stem, a head carried by said stem, transverse guideways on the outer face of said head, a tool holding block slidably mounted in said guideways, a slot through said head adjacent one end of said tool holding block, a disc rotatably mounted upon said stem to rotate therearound adjacent the inner face of said head, a scroll shaped track in the abutting face of said disc, a follower stud projecting from the abutting face of said tool holding block, through said slot in said head and into said track whereby rotation of said disc will cause said tool holding block to travel along said guide ways, a collar detachably mounted on said stem to surround the same adjacent the other face of said disc, friction means between said collar and disc, and indicating means upon the outer peripheries of said disc and head adapted to coact to indicate the adjustment therebetween circumferentially and the transverse travel of said tool holding block relative to the stem.

JEAN R. YOTTA.